Jan. 17, 1967
R. L. HOELTER
3,299,274
CHOPPER WITH ALTERNATING REFLECTIVE AND
ABSORPTIVE SEGMENTS FOR RADIANT ENERGY
MEASURING SYSTEM AND METHOD OF
OPTIMIZING SAME
Filed Dec. 5, 1963
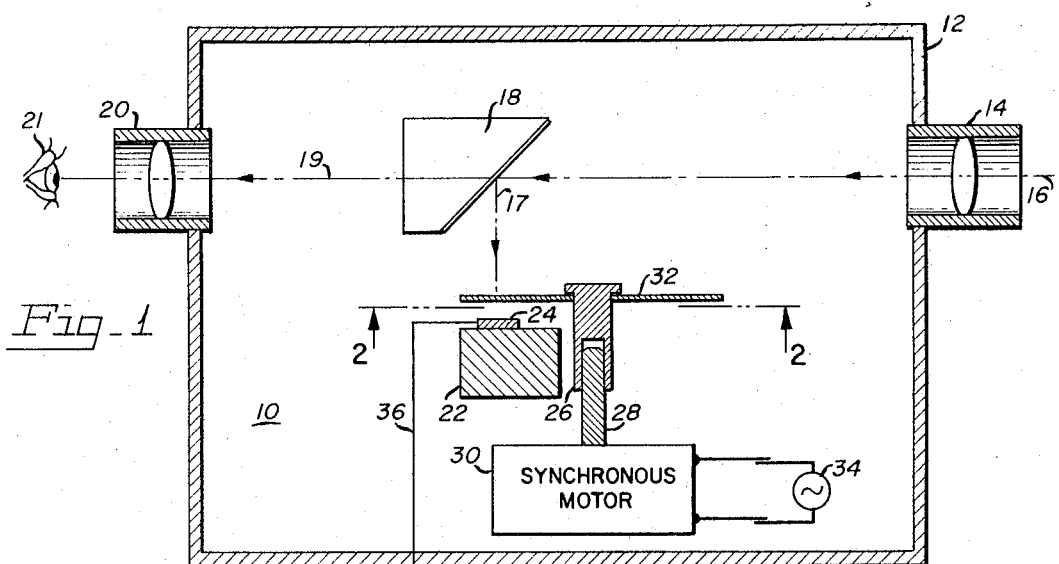
*Fig_1*
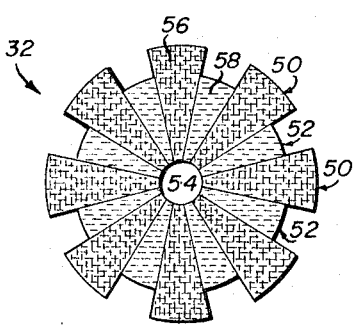
*Fig_2*
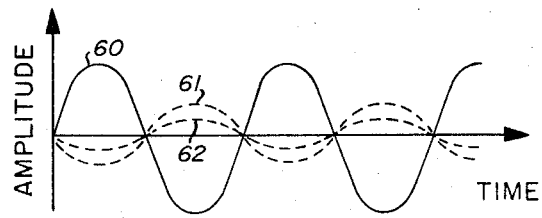
*Fig_4A*
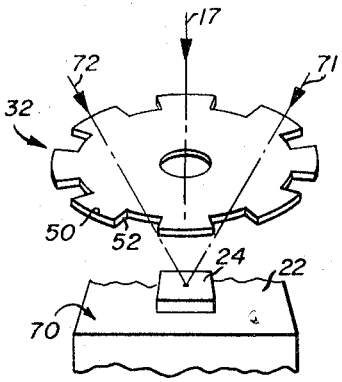
*Fig_3*
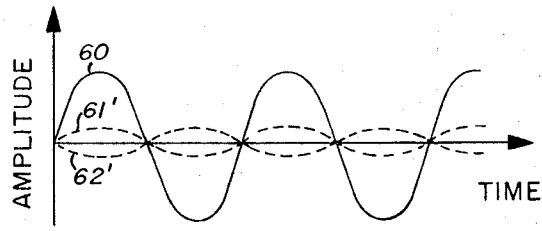
*Fig_4B*
INVENTOR.
ROGER L. HOELTER
BY
*Harvey S. Loewhurst*
ATTORNEY 3,299,274
CHOPPER WITH ALTERNATING REFLECTIVE AND ABSORPTIVE SEGMENTS FOR RADIANT ENERGY MEASURING SYSTEM AND METHOD OF OPTIMIZING SAME
Roger L. Hoelter, Mountain View, Calif., assignor to Huggins Laboratories, Inc., Sunnyvale, Calif., a corporation of California
Filed Dec. 5, 1963, Ser. No. 328,272
13 Claims. (Cl. 250—233)

This invention relates to radiant energy measuring systems and more particularly to a method and a construction for the error free modulating of the radiant energy to be measured.

It is well known that the emission of infrared radiation from an object is a sensitive, single valued function of the surface temperature of the object. The radiant energy so emitted is proportional to the fourth power of the absolute temperature of the surface of a black body (Stefan's Law) and is measured by focusing the radiant energy on the hot junction of a small thermopile or on a photoelectric device which produces an output signal proportionate to the radiant energy received.

Devices for measuring this radiant energy generally include an objective lens or aperture through which radiant energy enters the device, a radiant energy modulator such as a rotating toothed gear chopper wheel which chops the radiant energy, a radiant energy detector for providing an electrical signal commensurate with the modulated energy, and an electronic signal processing means for amplifying and utilizing the signal.

Typically, the radiant energy is collected by the objective lens from a well defined area on the source and focused onto the detector. The tooth chopper wheel modulator modulates the focused radiant energy by periodically interrupting or chopping the same prior to reaching the detector to produce modulated radiant energy which then illuminates the detector. The detector converts the focused and modulated radiant energy to an alternating signal voltage which is amplified and applied to a recorder or meter or other utilization device to provide a desired output commensurate with the temperature of the surface.

In connection with the measurement of radiant energy by the above described devices, it has been found that the modulation means also appears to modulate radiant energy emitted from within the measuring device to generate a residual signal which is unrelated to radiant energy emitted by the body whose temperature is to be measured. Such a residual signal has been found even when the objective lens of the device is covered so that no external radiant energy can enter. It has also been found, at least for some devices, that this signal is 180° out-of-phase with the signal produced by the externally observed radiant energy so as to reduce the signal generated by the externally applied radiant energy.

Therefore, the presence of the residual signal leads to lower temperature readings than those which should be read and thereby decreases the accuracy of the measuring device particularly in the measurement of temperatures just above the threshold of the device.

To my knowledge, no radiant energy modulator, located within the enclosure housing the detector, has been discovered which does not generate such a residual signal. To overcome the inaccuracy of the device caused by the presence of the residual signal, it has been suggested that the modulator be mounted outside the enclosure which houses the detector. However, such a construction has the disadvantage of requiring increased space and weight and is more expensive to manufacture. Also, without an enclosure, a mechanical modulator is unprotected and can be easily damaged and also is exposed to other extraneous radiation which would cause the generation of other unwanted signals but not related to the radiant energy to be measured.

It is therefore a primary objective of this invention to provide a radiant energy measuring system which is more accurate than measurement systems known heretofore.

It is another object of this invention to provide a radiant energy measuring system in which the radiant energy modulator is constructed to compensate or to eliminate any residual signal.

It is a further object of this invention to provide a new and improved mechanical radiant energy modulator for modulating incoming radiant energy.

It is still a further object of this invention to provide a radiant energy modulating means which has an undersurface constructed to utilize a portion of the internal radiant energy for generating a signal for compensating for the signal generated by the remaining portion of the internal radiant energy so that the total residual signal, averaged over a time interval corresponding to 180° of the modulating frequency, is equal to zero.

It is still another object of this invention to provide a method and apparatus of the above described character which eliminates factors extraneous to the desired temperature determination.

It is still a further object of this invention to provide a method and apparatus of the above described character which prevents the generation of a residual signal due to modulation of radiant energy internal to the measuring device.

Briefly, the radiant energy measurement system of this invention utilizes a rotating, toothed gear, chopper wheel modulator having its undersurface, that is the surface presented to the detector, coated in such a manner that the residual signal generated by one portion of the surface coating is equal and opposite to the residual signal generated by the remaining portion of the surface coating.

More particularly, the undersurface is so coated that the tooth portions generate one phase signal and the spaces between the tooth portions generate another phase signal and the coating is so selected that these two signals are 180° out-of-phase and of equal amplitude. For the system to be described hereinafter, it was found that the teeth should be highly absorptive and and the spaces between the teeth highly reflective so that the resulting residual signal becomes substantially equal to zero.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIG. 1 is a diagram of the radiant energy measuring system embodying the principles of this invention;

FIG. 2 is a view taken along line 2—2 of FIG. 1 showing the coated undersurface of the toothed gear chopper wheel;

FIG. 3 is an enlarged fraction perspective view of the chopper wheel and the detector means of FIG. 1 and is useful in explaining the operation of this invention; and FIGS. 4A and 4B are curves depicting the electrical signals generated by the radiant energy measuring system and are useful in explaining the construction embodied in this invention.

Referring now to FIG. 1, there is illustrated a radiant energy measurement device constructed in accordance with this invention and generally designated by reference character 10. Device 10 comprises, broadly speaking, a housing or enclosure 12 having a first opening for mounting an objective lens assembly 14 through which radiant energy, propagated along a beam path 16 from a hot surface whose temperature is to be measured, is admitted into housing 12. Objective lens assembly also focuses the radiant energy on a detector 24. Housing 12 has also a second opening for mounting an erecting eyepiece lens assembly 20 which is optically aligned with objective lens assembly 14.

Placed in the optical path between lens assemblies 14 and 20 is a beam splitter, diagrammatically shown as 18, which operates as a dichroic filter to pass all radiant energy shorter than a certain wave length along beam path 19 and to reflect all radiant energy longer than that certain wavelength along perpendicular beam path 17. A detector mount 22 is supported within enclosure 12 for supporting detector 24 which is placed in the beam path 17 and upon which radiant energy from path 16 is focused by objective lens assembly 14.

Detector 24 may be in the form of a conventional lead sulfide cell or lead selenide cell and is well known to those skilled in the art. A synchronous motor 30 having a motor shaft 28 is also mounted within enclosure 12. A coupling sleeve 26 is coupled to shaft 28 and carries a toothed gear chopper wheel 32 which is dimensioned such that a tooth shields and a space between two teeth exposes detector 24 to the radiant energy propagated along path 17. Motor 30 may be connected to a suitable source of motor supply voltage indicated at 34.

As a practical matter it has been found convenient to adhesively secure chopper wheel 32 to sleeve 26 by an adhesive compound but other methods of affixation can be utilized. Also the bore of sleeve 26 may be conveniently dimensioned to provide a tight coupling with shaft 28 or a set screw may be utilized to secure this connection.

Detector 24 is connected, via output lead 36, to an alternating current amplifier 38 whose output is applied, via lead 40, to a utilization device 42 which may be a meter or recorder or some other device providing an indication of the amplitude of the signal generated by the incoming radiant energy.

Referring now to FIG. 2 there is shown a view of the surface of chopper wheel 32 presented to detector 34. Chopper wheel 32 is provided with a number of circumferential teeth 50 separated by circumferential spaces 52 and a central opening 54 for sliding over the body portion of sleeve 26 for affixation against the head portion. The teeth and spaces extend radially outwards so that the sides of the teeth and spaces are radial and the shape of the teeth and spaces may be considered as annular sectors of circular sectors whose subtended angle defines the width of a tooth or space. By way of terminology, a circular sector whose annular sector defines a tooth will be referred to as a tooth sector and a circular sector whose outer arc defines the bottom of the space between adjacent teeth will be referred to as a space sector. It is of course immediately apparent that if a space sector and a tooth sector subtend the same angle, the former is smaller in area than the latter by the area of the projecting tooth since the tooth starts on the arc which terminates the space sector.

In the embodiment of chopper wheel 32 here shown, the tooth sectors are coated with a highly absorptive material as shown at 56 and the space sectors are coated with a highly reflective material as shown at 58. For a radiant energy measuring system of the geometry illustrated in FIG. 1, the extent, type and distribution of the alternate coatings shown in FIG. 2 have been found to substantially eliminate any residual signal as will be explained hereinafter.

As will also be explained hereafter, each measuring system may have its particular characteristics so that a careful selection must be made of the extent, type and distribution of the reflective and absorptive coating in accordance with the particular residual signal generated within a particular measurement system by a uniform coating.

In operation of device 10 of FIG. 1, radiant energy along beam path 16 is admitted into enclosure 12 through the objective lens assembly 14 which focuses the same so that the radiant energy deflected by beam splitter 18 along beam path 17 if focused upon detector 24. Beam splitter 18 may be constructed to pass visible light so that an eye located at 21 may sight along path 19 to target the measuring system upon the surface whose temperature is to be determined. By way of example, beam splitter 18 may transmit all radiant energy with a wavelength shorter than 1.5 microns and reflect all radiant energy with a wavelength longer than 1.5 microns. In this manner all infrared radiation is deflected upon the detector.

Infrared radiant energy propagated along beam path 17 is modulated by alternately encountering teeth 50 and spaces 52 of chopper wheel 32 and the modulated radiant energy is detected by detector 24. The output signal from detector 24 is applied to an alternating current amplifier 38 which rejects any direct current signal and which provides an output signal along lead 40 which varies with time as shown by curve 60, FIG. 4A.

Utilization device 42 may include a detector or some other device to measure and/or record the amplitude of curve 60. The amplitude of curve 60 corresponds, to some scale, to the absolute temperature of the surface emitting the radiant energy.

It has been found that when objective lens assembly 14 is obstructed so that no external radiant energy can enter enclosure 12, a residual signal is observed on output lead 40 when the undersurface of chopper wheel 32 is uniformly coated. For example it has been found that when the undersurface of chopper wheel 32 is made highly reflective, either by polishing the surface or by coating the same with a highly reflective material, and when the measuring device is adjusted so that a 150° F. surface yields a 10% deflection on a suitable utilization device, a residual signal is generated which causes a 40% deflection and which is 180 degrees out-of-phase with the signal ordinarily encountered when measuring radiant energy from an external source. This signal is shown as curve 61.

Likewise, it has been found that when the undersurface of chopper wheel 32 is coated with a highly absorbent material, and under like circumstances as indicated above, a residual signal is generated which causes a 20% deflection and which is again 180° out-of-phase with the normally developed signal. This signal is shown as curve 62.

Referring now to FIG. 3 there is shown a view of a section of chopper wheel 32 with tooth 50 located in beam path 17 to block incoming radiant energy from illuminating detector 24. Since both observed residual signals are 180° out-of-phase with the normal signal (curves 61 and 62), modulator means 32 must produce the maximum amplitude of the residual signals when in the position shown in FIG. 3.

Even though the operation of this invention is not fully understood the following explanation is advanced because it appears to account for the phenomena observed. When the undersurface of chopper wheel 32 is made highly reflective, the residual signal, shown as curve 61 in FIG. 4A, must arise from heat sources other than those directly above obstructing tooth 50. For example, the residual signal may arise from heat sources below wheel 32, as generally indicated at 70, in which wheel 12 deflects radiant energies from such a source 70 towards detector 24. Additionally, radiant energy from other locations in the enclosure 12 above wheel 32 may give rise to oblique beams of radiant energy as shown at 71 and 72 which may also contribute to the residual signal 61 if well defined as to directivity. The temperature of wheel 32 itself will not contribute to residual signal 61 since a perfect reflecting surface gives off no radiation. Accordingly, radiant energy, from above wheel 12 and directed along oblique beams 71 and 72, and from below wheel 12 at 70 is primarily responsible for residual signal 61. Of course if the residual signal found had been in phase with signal 60, then a source above detector 24 and above wheel 21 would have to be taken into account.

When the undersurface of chopper wheel 32 is coated with a highly absorptive material to generate a residual signal as shown by curve 62, the heat source responsible therefore cannot be source 70 since the absorptive coating would not reflect any radiant energy downwardly toward detector 24. However, oblique radiation, such as is propagated along beams 71 and 72, may contribute to residual signal 62 as well as the temperature of chopper wheel 32 itself. If residual signal 62 has been in phase with signal 60, then radiant energy from above chopper wheel 32, propagated along beam path 17, would have to be taken into account.

The foregoing explanation and isolation of the several heat sources responsible for residual signals 61 and 62 provide a basis for explaining the compensation provided by alternately coating the teeth sectors and space sectors with absorptive and reflective material.

For further simplification it may be argued that radiation from above the plane of chopper wheel 32 is scattered uniformly and therefore does not materially contribute to any residual signal because it impinges upon detector 24 from all angles and is therefore not modulated to any substantial extent by the rotation of chopper wheel 32. Therefore, neglecting oblique radiation along paths 71 and 72 the major heat source generating the residual signal from a highly reflective undersurface is source 70 and from a highly absorptive undersurface is the radiant energy from chopper wheel 32 itself.

By alternating highly absorptive teeth sectors and highly reflective space sectors the residual signal generated by the radiant energy due to chopper wheel 32 itself is substantially of the same character as curve 62 of FIG. 4A.

On the other hand, the reflective space sectors now illuminate detector 24 only when a space sector is opposite detector 24 so that the residual signal 61' generated thereby will be 180° out-of-phase with the signal generated by the absorptive teeth sectors and by carefully selecting the amount and extent of the reflective material applied, the former residual signal may be adjusted to entirely compensate the latter residual signal.

Another way of explaining the phenomena of the present invention is by considering a reflective and absorptive chopper wheel superimposed upon one another in such a manner that the reflective wheel is placed to generate an out-of-phase residual signal with that generated by the absorptive wheel. Also the relative amounts of reflective and absorptive material are adjusted to provide individual residual signals of substantially the same amplitude.

As already stated the reflective and absorptive areas may be exchanged making the reflective areas substantially larger than the absorptive areas. This arrangement becomes desirable when the residual signal due to the absorptive material exceeds the residual signal due to the reflective material for a uniformly coated wheel. In other words, the material for the tooth sector is preferably selected as the material which generates the smaller residual signal for uniform coating so that the material generating the larger residual signal can be applied to the smaller space sector to decrease its amplitude sufficiently to compensate but not to overcompensate for the other coating.

It is also to be noted that in order to achieve complete compensation of the reflectively and the absorptively generated residual signals, the coated area of the tooth sector and of the space sector may have to be adjusted for signal balance. For example if the reflectively generated residual signal is too large, the residual signal due to the reflective space sector may be decreased by letting some absorptive material from the tooth sector flow over, radially, into the space sector. This is tantamount to decreasing the angle subtended by the coating applied to the space sector (without however decreasing the physical distance between adjacent teeth). Another method for balancing the reflectively generated residual signal is to provide an annulus of absorptive coating.

There has been described hereinabove a radiant energy measurement system and a method for substantially eliminating the residual signal so that accurate measurements of temperature may be made. To take into account the geometry of the radiant energy measuring system, a determination is made whether the signal due to a reflective or an absorptive chopper wheel is greater and the material providing the smaller signal is applied to the tooth sectors. Thereafter the other material is applied to the space sectors and the amount of area covered is adjusted until complete compensation is had.

What is claimed is:

1. In a radiant energy measuring system for determining a characteristic of a body in which an optical system collects a solid angle of radiation emanating from said body into an optical path and directs said path upon a detector means responsive to said radiation and in which said radiation is modulated prior to reception by said detector means, a modulation means comprising: a rotating toothed gear chopper wheel having alternating circumferential teeth and spaces, the rotating axis of said wheel being substantially parallel to said optical path and being spaced therefrom so that the optical path is alternately obturated by said teeth, the surface of said chopper wheel facing said detector having reflective and absorptive portions arranged in an alternating pattern corresponding to that of said teeth and spaces.

2. In a radiant energy measuring system for determining a characteristic of a body in which an optical system collects a solid angle of radiation emanating from said body into an optical path and directs said path upon a detector means responsive to said radiation and in which said radiation is modulated prior to reception by said detector means, a modulation means comprising: a rotating toothed gear chopper wheel having alternating circumferential teeth and spaces, the rotating axis of said wheel being substantially parallel to said optical path and being spaced therefrom so that the optical path is alternately obturated by said teeth, the surface of said chopper wheel facing said detector having radiation reflective sectors and radiation absorptive sectors which alternate with the same periodicity as the sectors defined by said teeth and spaces.

3. In a radiant energy measuring system for determining a characteristic of a body in which an optical system collects a solid angle of radiation emanating from said body into an optical path and directs said path upon a detector means responsive to said radiation and in which said radiation is modulated prior to reception by said detector means, a modulation means comprising: a rotating toothed gear chopper wheel having alternatigg circumferential teeth and spaces, the rotating axis of said wheel being substantially parallel to said optical path and being spaced therefrom so that the optical path is alternately obturated by said teeth, the surface of said chopper wheel facing said detector having radiation absorptive teeth sectors and radiation reflective space sectors.

4. In a radiant energy measuring system for determining a characteristic of a body in which an optical system collects a solid angle of radiation emanating from said body into an optical path and directs said path upon a detector means responsive to said radiation and in which said radiation is modulated prior to reception by said detector means, a modulation means comprising:

a rotating toothed gear chopper wheel having alternating circumferential teeth and spaces, the rotating axis of said wheel being substantially parallel to said optical path and being spaced therefrom so that the optical path is alternately obturated by said teeth, the surface of said wheel facing said detector being radiation absorptive and having disposed thereon a plurality of identical radiation reflective portions, each of said reflective portions being associated with a different tooth and space sector combination.

5. In a radiant energy measuring system for determining a characteristic of a body in which an optical system collects a solid angle of radiation emanating from said body into an optical path and directs said path upon a detector means responsive to said radiation and in which said radiation is modulated prior to reception by said detector means, a modulation means comprising: a rotating toothed gear chopper wheel having alternating circumferential teeth and spaces, the rotating axis of said wheel being substantially parallel to said optical path and being spaced therefrom so that the optical path is alternately obturated by said teeth, the surface of said wheel facing said detector being radiation reflective and having disposed thereon a plurality of identical radiation absorptive portions, each of said absorptive portions being associated with a different tooth and space sector combination.

6. In a radiant energy measuring system for determining a characteristic of a body in which an optical system collects a solid angle of radiation emanating from said body into an optical path and directs said path upon a detector means responsive to said radiation and in which said radiation is modulated prior to reception by said detector means, a modulation means comprising: a rotating toothed gear chopper wheel having alternating circumferential teeth and spaces, the rotating axis of said wheel being substantially parallel to said optical path and being spaced therefrom so that the optical path is alternately obturated by said teeth, each sector of the surface of said chopper wheel facing said detector subtended by an adjacent tooth and space including a radiation reflective portion and a radiation absorptive portion.

7. The combination in accordance with claim 6 in which all sectors subtend the same angle at the center of said chopper wheel.

8. The combination in accordance with claim 6 in which the size and position of the reflective portions are selected to generate an internal signal which is equal in amplitude and opposite in phase to the internal signal generated by the absorptive portions.

9. A method of compensating for the residual signal generated from internal sources of radiant energy of a radiant energy measuring system contained within an enclosure having an optical system for collecting a solid angle of radiation emanating from an external source of radiant energy into an optical path and for suitably filtering said radiation and for directing said radiation upon a detector means and in which a rotating toothed gear chopper wheel having its circumferential teeth and spaces alternately block and pass the optical path to modulate said radiation, the method comprising the steps of:

obstructing the optical system so that no external radiation is admitted into the enclosure housing the radiant energy measuring system;

taking a first measurement with a chopper wheel having a uniformly highly absorptive surface facing the detector to derive a first signal;

taking a second measurement with a chopper wheel having a uniformly highly reflective surface facing the detector to derive a second signal; and comparing the signals and preparing the surface of the chopper wheel facing the detector in such a manner that at least a substantial portion of each space sector is reflective and the remaining portion of the surface is absorptive when the second signal is larger than the first signal, and at least a substantial portion of each space sector is absorptive and the remaining portion of the surface is reflective when the first signal is larger than the second signal.

10. A method of compensating for the residual signal generated from internal sources of radiant energy of a radiant energy measuring system contained within an enclosure having an optical system for collecting a solid angle of radiation emanating from an external source of radiant energy into an optical path and for suitably filtering said radiation and for directing said radiation upon a detector means and in which a rotating toothed gear chopper wheel having its circumferential teeth and spaces alternately block and pass the optical path to modulate said radiation, the method comprising the steps of:

obstructing the optical system so that no external radiation is admitted into the enclosure housing the radiant energy measuring system;

taking a first measurement with a chopper wheel having a uniformly highly absorptive surface facing the detector to derive a first signal;

taking a second measurement with a chopper wheel having a uniformly highly reflective surface facing the detector to derive a second signal; and comparing the signals and preparing the surface of the chopper wheel facing the detector in such a manner that at least a substantial portion of each tooth sector is reflective and the remaining portion of the surface is absorptive when the first signal is larger than the second signal, and at least a substantial portion of each tooth sector is absorptive and the remaining portion of the surface is reflective when the second signal is larger than the first signal.

11. A method of compensating for the residual signal generated from internal sources of radiant energy of a radiant energy measuring system contained within an enclosure having an optical system for collecting a solid angle of radiation emanating from an external source of radiant energy into an optical path and for suitably filtering said radiation and for directing said radiation upon a detector means and in which a rotating toothed gear chopper wheel having its circumferential teeth and spaces alternately block and pass the optical path to modulate said radiation, the method comprising the steps of:

obstructing the optical system so that no external radiation is admitted into the enclosure housing the radiant energy measuring system;

taking a first measurement with a chopper wheel having a uniformly highly absorptive surface facing the detector to derive a first signal;

taking a second measurement with a chopper wheel having a uniformly highly reflective surface facing the detector to derive a second signal; and comparing the signals and preparing the surface of the chopper wheel facing the detector in such a manner that at least a substantial portion of each space sector is absorptive and the remaining portion of the surface is reflective when the first signal is larger than the second signal and at least a substantial portion of each space sector is reflective and the remaining portion of the surface is absorptive when the second signal is larger than the first signal.

12. A method of compensating for the residual signal generated from internal sources of radiant energy of a radiant energy measuring system contained within an enclosure having an optical system for collecting a solid angle of radiation emanating from an external source of radiant energy into an optical path and for filtering said radiation and for directing said radiation upon a detector means and in which a rotating toothed gear chopper wheel having its circumferential teeth and spaces alternately block and pass the optical path to modulate said radiation, the method comprising the steps of:

obstructing the optical system so that no external radiation is admitted into the enclosure housing the radiant energy measuring system;

taking a first measurement with a chopper wheel having a uniformly highly absorptive surface facing the detector to derive a first signal;

taking a second measurement with a chopper wheel having a uniformly highly reflective surface facing the detector to derive a second signal; and constructing a chopper wheel having a surface facing the detector means which is absorptive with a reflective portion in each space sector if the amplitude of the second signal exceeds the first signal, and which is reflective with an absorptive portion in each space sector if the amplitude of the first signal exceeds the second signal.

13. A method for compensating for the residual signal generated from internal sources of radiant energy of a radiant energy measuring system contained within an enclosure having an optical system for collecting a solid angle of radiation emanating from an external source of radiant energy into an optical path and for filtering said radiation and for directing said radiation upon a detector means and in which a rotating toothed gear chopper wheel having its circumferential teeth and spaces alternately block and pass the optical path to modulate said radiation, the method comprising the steps of:

obstructing the optical system so that no external radiation is admitted into the enclosure housing the radiant energy measuring system;

taking a first measurement with a chopper wheel having a uniformly highly absorptive surface facing the detector to derive a first signal;

taking a second measurement with a chopper wheel having a uniformly highly reflective surface facing the detector to derive a second signal; and constructing a chopper wheel having a surface facing the detector means which is absorptive with a reflective portion in each space sector if the amplitude of the second signal exceeds the first signal, and which is reflective with an absorptive portion in each space sector if the amplitude of the first signal exceeds the second signal, and in which the size and location of the portion in the space sector is selected in accordance with the relative amplitude of the first and second signal.

References Cited by the Examiner
UNITED STATES PATENTS

| | | | |
|---|---|---|---|
| 2,963,910 | 12/1960 | Astheimer | 250—83.3 |
| 3,039,006 | 6/1962 | Weiss | 250—233 |
| 3,097,300 | 7/1963 | Wormser et al. | 250—233 X |
| 3,169,189 | 2/1965 | Barnes et al. | 250—83.3 |
| 3,175,092 | 3/1965 | Leftwich | 250—233 |
| 3,234,380 | 2/1966 | Liston et al. | 250—83.3 |

RALPH G. NILSON, *Primary Examiner.*

M. A. LEAVITT, *Assistant Examiner.*